UNITED STATES PATENT OFFICE.

MALCOLM N. RICH, OF CLEVELAND, OHIO.

RECOVERING ZIRCONIUM OXIDE.

No Drawing. Application filed September 8, 1919, Serial No. 322,415. Renewed November 21, 1922.

*To all whom it may concern:*

Be it known that I, MALCOLM N. RICH, a citizen of the United States, residing at Cleveland, in the county of Cuyahoga and State of Ohio, have invented certain new and useful Improvements in Recovering Zirconium Oxide, of which the following is a specification.

This invention relates to the recovery of zirconium oxide; and it comprises a method wherein ores of zirconium, such as the oxide, the silicate, etc., are treated with sulfuric acid at a tolerably high temperature to form a crude zirconium sulfate, the acid treatment being performed under cover, the crude sulfate is then heated at a somewhat higher temperature in a current of air or some other gas to remove the excess of acid, the material is then extracted with water and the solution filtered, the filtrate is allowed to stand for a time to undergo internal actions, and the liquid is then diluted with water and the crystallization of a basic sulfate produced; all as more fully hereinafter set forth and as claimed.

The commercial sources of zirconium and zirconium compounds are various ores and concentrates containing zirconium oxide or zirconia (baddeleyite or brazilite), zirconium silicate (zircon), etc. These commercial materials are more or less impure and it is the object of the present invention to produce therefrom zirconia, $ZrO_2$, of relatively great purity by a simple, economical and ready method. To this end, advantage is taken of the properties of the various sulfates of zirconium. In the presence of sufficient sulfuric acid zirconium compounds are converted into a saturated sulfate or what might be called for the present purposes, the normal sulfate, $Zr(SO_4)_2$, which is soluble in water. This sulfate contains two equivalents of sulfuric acid for each equivalent of zirconia, $ZrO_2$. Its solutions in water tend to a molecular rearrangement with liberation of part of this acid and the formation of a relatively insoluble and more basic sulfate, having the empirical formula $4ZrO_2.3SO_3.14H_2O$. This basic sulfate crystallizes well and with proper conditions of operation separates practically free from the impurities likely to occur together with the zirconia in the ore. Its formation and separation however are much affected by the presence of other soluble sulfates in the solution of zirconium sulfate. It will be noted from the formula given above that in the formation of the basic sulfate from the normal sulfate according to the following reaction

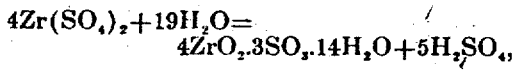

$$4Zr(SO_4)_2 + 19H_2O = 4ZrO_2.3SO_3.14H_2O + 5H_2SO_4,$$

a little more than one-half (⅝) of the sulfuric acid of the normal sulfate separates as free acid. In strong solutions the reaction only goes to a certain point and then stops since the liberated acid tends to redissolve the basic sulfate, or, which is the same thing, prevents its formation. I have however found that if the acidity be kept within certain limits by the presence of sufficient water, the separation of basic sulfate becomes practically quantitative and the sulfate so produced is substantially pure, since other sulfates which may be present do not undergo this hydrolytic reaction and since the acid separating in the formation of the basic zirconium sulfate tends to keep them in solution. I may note in this connection however that certain sulfates which do not thus precipitate tend to retard the formation and separation of basic sulfate of zirconium.

In the present method I first convert the zirconium material into the sulfate by heating with strong sulfuric acid. Native zirconia, zirconium silicate, etc., are all readily sulfated by sulfuric acid at temperatures around 400° C. The amount of acid necessary with any particular ore or concentrate of course depends upon and varies with the composition of the material; but as a general rule it requires about four parts of commercial acid to one part of the ore. Apparatus made of any of the ordinary irons or steels resistant to the action of sulfuric acid may be used in sulfating the ore. Sulfating may be done under pressure which quickens the operation but is not necessary. It is, however, advisable to sulfate under cover to prevent loss of material and of acid. Any reflux condenser arrangement may be employed. The sulfating heating requires from 1 to 3 hours, according to the material treated at one time, its physical character, the proportion of acid, etc. In the case of any particular ore-acid mixture the progress of the sulfating operation may be readily shown by analysis and the time required for completion ascertained. When it is complete, the excess of sulfuric acid is fumed off in any convenient way. Removal of the excess acid is necessary since the rest of the subsequent operations depend in a large measure upon the particular acidity of the extracts made from the sulfated ore. I find that it is best to raise the temperature slowly to between 600° and 650° C. in a good current of air or other gas, this treatment being prolonged during such period of time as is necessary to get rid of the free acid. This manner of ignition also serves the further purpose of decomposing certain acid sulfates of iron and titanium which are formed during the acid digestion with most ores and which are decomposed at 500 to 550° C.

Presuming the ore to be treated to be mainly zirconia, the sulfating operation makes nearly the whole mass soluble in water, but if the ore contains zircon (zirconium silicate there is a considerable amount of insoluble silica produced. With impure ores there is generally also considerable insoluble residual matter.

I next dissolve the sulfates in cold water, that is, water at the ordinary temperature, using a certain amount of water. The solution may be effected in any of the usual ways, by extraction or leaching or agitation with water followed by decanting and filter pressing. The amount of water used is determined by the acidity of the solution produced and I aim to use enough water to have the acidity between 0.5 per cent and 3.5 per cent of sulfuric acid. The amount of water necessary for producing a solution with this degree of acidity of course varies with the care exercised in fuming off excess acid; and it also varies with the particular ore sulfated, since some ores contain more impurities than others and additional water may be necessary to produce separation of the basic sulfate. As stated, some of these impurities tend to retard to some extent the formation and separation of the basic sulfate of zirconium. For obvious reasons, in the sulfating operation I try to drive off as much of the excess sulfuric acid as possible and the standardize conditions in successive sulfating operations.

Ordinarily I allow from 2 to 5 hours for effecting solution of the sulfate, as the zirconium sulfate does not go into solution with water very rapidly. The more efficient the stirring or agitation of the solution, the shorter the time required. After the zirconium sulfate is in solution, the liquid is filtered or decanted or both, using any convenient type of apparatus, such as a filter press. The filtered or clarified liquor I run into large tanks of incorrodible material, such as wood, stoneware, enameled metal, etc., and allow it to stand at the ordinary temperature for 24 hours. The precise degree of temperature during this time is not particularly important, save that it should not rise above 60° C. and should not be below 10° C. While standing, the solution does not undergo any visible change for at least 5 hours and sometimes not for 24 hours, except, perhaps, for the development of a slight cloudiness; but an internal hydrolysis, or conversion, or molecular rearrangement, takes place. If the solution at the end of 24 hours be vigorously agitated, a separation of crystals of the basic sulfate will take place. After the solution has been thus agitated and the basic salt separated out, the solution is further diluted to a certain maximum dilution, one which will permit the entire content of zirconium sulfate in the solution to undergo this conversion; the amount of water being sufficient to insure that the acid formed in hydrolysis shall not raise the acidity above the upper limit of the 0.5—3.5 per cent range. The dilution of the solution is controlled by the amount of free acid present, or potentially present, in the solution. Indirectly, the extent of the dilution is also controlled by the amount of impurities present in the solution as these retard the separation of the basic sulfate and their effect can be most easily overcome by further dilution, observing however the precaution of keeping the acidity of the solution above 0.5 per cent. Below 0.5 per cent acidity, various undesirable compounds separate, carrying down iron, titanium, etc. All the water necessary for this dilution may be added at once, or it may be added by degrees, or at intervals. The solution should always have an initial acidity of at least 0.5 per cent and should never exceed an acidity of 3.5 per cent.

This operation as described may be followed and controlled analytically but in pratice it is preferred to standardize the roasting and other conditions according to an experimental run.

If the conditions set forth are carefully followed, the recovery of zirconia as basic sulfate will be 90–95 per cent of the total zirconium present in the solution. The residual zirconia left in the mother liquors may be precipitated in any convenient manner and added to a fresh run.

During the crystallization, agitation is found to hasten and facilitate the operation. The liquid undergoing crystallization should be agitated at least once a day and advantageously more frequently. Agitation shortens the time of crystallization. Ordinarily, however, in order to secure the maximum separation, I allow the material to stand for about four days. After this time, the sides and the bottom of the vat or tank are thoroughly scratched to detach the adhering crystals and the supernatant liquor is decanted after the precipitate has settled. The basic sulfate precipitate may be agitated with clear water for a few minutes and allowed to settle and the clear liquor decanted. This washing is repeated until there is no further test for iron and titanium. The solution with which the sulfates are washed may be rendered slightly acid with sulfuric acid, not exceeding an acidity of 3 to 4 per cent to prevent iron and titanium sulfates from hydrolyzing during the washing. The crystals are collected and dried, using suction if desired. The dried material may be heated to 100° C. for some time in order to complete the expulsion of moisture. It is then finely ground and heated to a high temperature, say, 1000° C. for some time, advantageously in a current of air to decompose the sulfate. The liberated sulfur oxids and acids may be, if desired, recovered in any convenient manner. The calcined product will be a pure white product substantially free of impurities. As a rule it contains no silica, and not to exceed 0.6 per cent of titanic oxid. Iron is rarely present in amount to exceed 0.10 per cent. If the sulfuric acid has been completely removed by the calcining operation, it should run 99.8 or 99.9 per cent $ZrO_2$.

The presence of sulfates of calcium, potassium, sodium or ammonium interferes materially with the separation of the desired basic sulfate; and when salts or compounds of these bases are present in the original material, they should be removed as far as possible preliminary to using the present process. Zirconium salts in solution have a tendency to form complex bodies with the salts of the more positive metals; and in the presence of these salts the separation of a pure basic sulfate does not take place readily. In the presence of any substantial amount of these sulfates very high dilutions are necessary to accomplish the present object.

In a specific embodiment of the present invention with a Brazilian zirkite ore, 2 parts of the ore are mixed with 8 parts of ordinary concentrated commercial sulfuric acid in a cast iron vessel and the mixture heated to about 400° C. Means, such as herein before indicated, should be adopted to prevent loss of too much acid during this heating operation. The mixture I digest for about two hours, stirring rather frequently to prevent caking. At the end of the two hour period, free escape of the sulfuric acid is permitted until the mass is dry or nearly so. At this stage of the operation there may be some spattering of the material, and means should be adopted to prevent its effect. Finally I pass a strong current of air over the dry, or nearly dry, mass which may be still in the reaction vessel, and slowly raise the temperature to between 600 and 650° C., frequently stirring the mass to loosen it and to permit the extrication of all traces of free acid. After the free acid is removed, the material is cooled, crushed or comminuted, if necessary, and slowly added to cold water. The extent of the recovery of zirconia as basic sulfate will depend largely on the care with which these operations are conducted. With a 100 per cent recovery of the zirconium from the ore (zirkite), 2 parts of the ore should yield 3.45 parts of normal zirconium sulfate. This amount of ore after sulfatation is usually extracted with 110 parts of water. This will give a dilution ratio of between 30 and 40 parts water to one of the normal sulfate, which has been shown from experiment to yield a solution with an acidity of between 0.5 per cent and 3.5 per cent with this Brazilian zirkite ore. After adding the water, the mixture may be stirred or agitated in any convenient manner, as by blowing through air. After two, or three hours (according to conditions), the liquid is separated from the insoluble material and run into a tank which should be covered to keep out dust and foreign matters. In this tank it is allowed to stand for 24 hours undisturbed. At the end of this time, a little previously formed basic sulfate is added, or the tank is vigorously scratched with a wooden paddle. I then add enough water to make the dilution ratio as close to 50:1 as is convenient. After the addition of the water, I let the solution stand for 4 days, frequently using a scratcher paddle to accelerate crystallization. I then separate the mother liquor and wash the precipitate as hereinbefore described. I then ignite to 1000° C. in a strong current of air, as hereinbefore described.

In the case of ores or crude material containing salts of calcium, potassium, sodium or ammonium, I customarily boil the material with dilute acid (sulfuric or hydrochloric) prior to the sulfating roast. This treatment serves to remove these salts and also much of the iron and titanium and other foreign material present. It may be noted in this connection that even traces of potassium, calcium, sodium or ammonium sulfates in the solution at the time of crystallization will cut down the recovery of the basic sulfate materially.

What I claim is:

1. In the recovery of zirconia, the process which comprises producing a solution of normal zirconium sulfate in water substantially free from sulfates of alkalis and alkaline earths and of slightly acid nature, allowing said solution to stand with frequent agitation for about four days, and separating the mother liquor from the deposited basic zirconium sulfate.

2. In the recovery of zirconia, the process which comprises producing a solution of normal zirconium sulfate in water of an acidity between 0.5 and 3.5 per cent free sulfuric acid and of a dilution varying between 16 parts of water to 1 part of normal sulfate and 80 parts of water to 1 part of sulfate and allowing said solution to stand at the ordinary temperature with frequent agitation to produce a separation of crystallized basic zirconium sulfate.

3. In the recovery of zirconia from its ores, the process which comprises digesting said ore with sulfuric acid at a temperature around 400° C. until the bases are converted into sulfates, and raising the temperature of the mixture to between 600° and 650° C. to expel free acid.

4. In the recovery of zirconia from its ores, the process which comprises digesting said ore with sulfuric acid at a temperature around 400° C. until the bases are converted into sulfates, raising the temperature of the mixture to between 600° and 650° C. to expel free acid, taking up the treated material with water of the ordinary temperature in sufficient amount to give a solution containing between 0.5 and 3.5 per cent free acid and allowing the solution so obtained to stand at temperatures between 10° C. and 60° C. until a separation of basic zirconium sulfate occurs.

5. In the recovery of zirconia from its ores, the process which comprises digesting said ore with sulfuric acid at a temperature around 400° C. until the bases are converted into sulfates, raising the temperature of the mixture to between 600° and 650° C. to expel free acid, taking up the treated material with water of the ordinary temperature in sufficient amount to give a solution containing between 0.5 and 3.5 per cent free acid, allowing the solution so obtained to stand at temperatures between 10° C. and 60° C. until a separation of basic zirconium sulfate occurs, further diluting with sufficient water to give a final liquid not containing more than 3.5 per cent free sulfuric acid and allowing the liquid to stand with frequent agitation until all, or substantially all, of the zirconium has crystallized out as basic sulfate.

In testimony whereof, I affix my signature hereto.

MALCOLM N. RICH.